US007825192B2

(12) United States Patent
Gane et al.

(10) Patent No.: US 7,825,192 B2
(45) Date of Patent: Nov. 2, 2010

(54) COPOLYMER HAVING AT LEAST ONE ALKOXY-OR HYDROXY-POLYALKYLENE GLYCOL GRAFTED FUNCTION, AND USE THEREOF

(75) Inventors: Patrick Gane, Studenweg (CH); Matthias Buri, Mätteliweg (CH); Michael Kaessberger, Schauensee (CH)

(73) Assignee: Omya Development AG, Oftringen (CH)

( * ) Notice: Subject to any disclaimer, the term of this patent is extended or adjusted under 35 U.S.C. 154(b) by 990 days.

(21) Appl. No.: 10/532,475

(22) PCT Filed: Nov. 7, 2003

(86) PCT No.: PCT/IB03/05082

§ 371 (c)(1),
(2), (4) Date: Feb. 27, 2006

(87) PCT Pub. No.: WO2004/041883

PCT Pub. Date: May 21, 2004

(65) Prior Publication Data

US 2006/0142498 A1  Jun. 29, 2006

(30) Foreign Application Priority Data

Nov. 8, 2002  (FR)  .................................. 02 13999

(51) Int. Cl.
  *C08F 297/02*  (2006.01)
(52) U.S. Cl. .......................... 525/242; 528/25; 528/425
(58) Field of Classification Search ................. 525/242; 528/25, 425

See application file for complete search history.

(56) References Cited

U.S. PATENT DOCUMENTS 5,491,209 A  2/1996  Helmer et al.

| 6,093,764 A | 7/2000 | Egraz et al. |
| 6,414,074 B1 | 7/2002 | Blum |
| 2006/0106186 A1* | 5/2006 | Dupont et al. ................ 528/25 |

FOREIGN PATENT DOCUMENTS

| FR | 2 766 107 A |  | 1/1999 |
| FR | 2 810 261 A |  | 12/2001 |
| JP | 58109700 |  | 12/1981 |
| JP | 08-053354 |  | 2/1996 |
| JP | 10030010 | * | 2/1998 |
| JP | 11104479 |  | 4/1999 |
| JP | 11116238 |  | 4/1999 |
| JP | 20002292 |  | 8/2000 |
| JP | 2000229233 | * | 8/2000 |
| JP | 2004550741 |  | 2/2006 |

OTHER PUBLICATIONS

Tricot et al., "Comparison of Experimental and Theoretical Persistence Length of Some Polyelectrolytes at Various Ionic Strength," Macromolecules 17(9):1698-1704, 1984.
Hourdet et al., "Synthesis of Thermoassociative Copolymers," Polymer 18(10): 2535-2547, 1997.

* cited by examiner

Primary Examiner—Robert D. Harlan
(74) Attorney, Agent, or Firm—Amster, Rothstein & Ebenstein LLP

(57) ABSTRACT

The present invention relates to the technical mineral matter suspension sector, and, before and/or after drying, their applications in the fields of paper, paint and, after drying, plastics. It also relates to the use of a copolymer having at least one alkoxy or hydroxy polyalkylene glycol function grafted onto at least one ethylenically unsaturated monomer, as agent whose role is to enhance the gloss of the final product and, in particular, the gloss of the sheet of paper, irrespective of the viewing angle.

43 Claims, No Drawings

COPOLYMER HAVING AT LEAST ONE ALKOXY-OR HYDROXY-POLYALKYLENE GLYCOL GRAFTED FUNCTION, AND USE THEREOF

This application is a U.S. National Phase of PCT Application No. PCT/IB2003/005082, filed Nov. 7, 2003, and claims priority to French Application No. 02/13999, filed Nov. 8, 2002.

This invention relates to the technical sector of suspensions of mineral matter, and, before and/or after drying, their applications in the paper and paint industry, and, after drying, plastics, and more particularly in their paper applications, including, in particular, the field of paper coating colours, with a view to offering an improvement in the gloss, especially the gloss of the paper sheet.

The invention first of all relates to the use of a water-soluble copolymer, preferably a weakly ionic and water-soluble copolymer having at least one alkoxy or hydroxy polyalkylene glycol function grafted onto at least one ethylenically unsaturated monomer, as an agent whose role is to improve the gloss of the finished product and in particular the gloss of the paper sheet, irrespective of the viewing angle, i.e. an angle of between 20° and 85°, and more particularly between 45° and 75°.

The invention also relates to an agent for improving the gloss of the finished product, irrespective of the viewing angle, i.e. an angle of between 20° and 85°, more particularly between 45° and 75°.

The invention also relates to the use of a water-soluble copolymer, preferably a weakly ionic water-soluble copolymer having at least one alkoxy or hydroxy polyalkylene glycol function grafted onto at least one ethylenically unsaturated monomer, as an agent whose role is to improve the gloss of the finished product and in particular the gloss of the paper sheet, irrespective of the viewing angle, i.e. an angle of between 20° and 85°, and more particularly between 45° and 75°, and its implementation in a pigment and/or mineral filler dispersion method in aqueous suspension. It also relates to the dispersion method that implements said copolymer and the aqueous suspensions thus obtained.

The invention also relates to the use of a water-soluble copolymer, preferably a weakly ionic water-soluble copolymer having at least one alkoxy or hydroxy polyalkylene glycol function grafted onto at least one ethylenically unsaturated monomer, as an agent whose role is to enhance the gloss of the finished product, in particular the gloss of the sheet of paper, irrespective of the viewing angle, i.e. an angle of between 20° and 85°, and more particularly between 45° and 75° and its implementation in a pigment and/or mineral filler grinding method in aqueous suspension. It also relates to the grinding method that implements said copolymer and the aqueous suspensions thus obtained.

It also relates to the use of said aqueous suspensions for the manufacture of coating colours. It also relates to the coating colour manufacturing method that implements said copolymer and the coating colours thus obtained.

Finally, it also relates to the use of said coating colours for coating the papers. It also relates to the papers thus obtained.

The invention also relates to the use of a water-soluble copolymer, preferably a weakly ionic water-soluble copolymer having at least one alkoxy or hydroxy polyalkylene glycol function grafted onto at least one ethylenically unsaturated monomer, as an agent whose role is to improve the gloss of the finished product, in particular the gloss of the paper sheet, irrespective of the viewing angle, i.e. an angle of between 20° and 85°, and more particularly between 45° and 75°, and its implementation in a coating colour manufacturing method. It also relates to the coating colours thus obtained.

It also relates to the use of the coating colours thus obtained for coating the papers. Finally, it relates to the papers thus obtained.

Finally, the invention also relates to the use of a water-soluble copolymer, preferably a weakly ionic water-soluble copolymer having at least one alkoxy or hydroxy polyalkylene glycol function, as a gloss enhancement agent in the field of paint and plastics.

The paper manufacturing method comprises several stages, including: the slurrying of the pigments and/or fillers; the use of said suspensions or slurries to manufacture fillers and/or coating colours; the use of said coating colours and said fillers to manufacture and/or coat the papers. Throughout this method, the skilled man in the art will keep in mind the need to obtain a final product presenting a strong activation of the gloss, as the enhancement of the gloss of the paper sheet is a matter of major concern for paper manufacturers. This property of enhancing the gloss of the paper sheet, together with the known means for enhancing the gloss during the course of the method described above, are subsequently illustrated via documents accessible to one skilled in the prior art.

During the course of said method, the mineral fillers and/or pigments, such as calcium carbonate, dolomites, magnesium hydroxide, kaolin, talc, gypsum, titanium oxide, satin white or aluminium trihydroxide, are initially slurried. To do this, use is made of the dispersion and/or grinding aid agents of these pigments and/or mineral fillers still referred to as mineral matter.

It is to be noted that, throughout the description, we refer to both mineral matter and fillers and/or pigments, as these terms have the same meaning for the Applicant.

These dispersion and/or grinding aid agents behave as rheology modifiers in so far as they fluidify said suspensions. The mechanical action of grinding, facilitated by the use of grinding aid agents, also contributes to reducing the size of the particles. Use can also be made of additives that make it possible to regulate the viscosity of said suspensions of mineral matter.

Thus, the skilled man in the art will be familiar with document EP 0 610 534 which teaches how to prepare polymers obtained by the copolymerization of an isocyanate monomer and aprotic monomers and then by functionization using glycol polyalkylene monoalkyl amines or ethers. Such agents are particularly effective for grinding organic pigments.

He will also be familiar with document WO 00/77058 which describes copolymers based on an unsaturated derivative of a mono- or dicarboxyl acid, of oxyalkylene glycol ether, of vinyl polyalkylene glycol, of a polysiloxane compound or of an ester These copolymers are used as dispersing agents in mineral filler suspensions, particularly in the cement industry.

He will also be familiar with document WO 01/96007, which describes an ionic, water-soluble copolymer, having a grafted alkoxy polyalkylene glycol function, the role of which is to disperse and/or facilitate the grinding of the pigments and/or the mineral fillers.

Similarly, the skilled man in the art will be familiar with document FR 2 707 182 which teaches how to use a polymeric compound based on polyacrylic acid salts and phosphonates to fluidify suspensions of inorganic pigments.

Moreover, document WO 94/24202 proposes non water-soluble latexes for coating compositions but these do not make it possible to attain high gloss values irrespective of the viewing angle, i.e. an angle of between 20° and 85°, and more particularly between 45° and 75°.

However, neither this document, nor the others that appear in the prior art, teach that grafting an alkoxy or hydroxy polyalkylene glycol group enhances the gloss of the paper sheet irrespective of the viewing angle, i.e. an angle of between 20° and 85°, and more particularly between 45° and 75°.

Said aqueous suspensions of pigments and/or of mineral fillers then enter into the composition of the coating colours.

Pursuing his her research with a view to increasing the gloss, in particular the gloss of the paper sheet, the Applicant surprisingly found that the use in mineral filler grinding method, mineral filler dispersion method, and coating colour manufacturing method, of a water-soluble copolymer, preferably a weakly ionic water-soluble copolymer having at least one alkoxy or hydroxy polyalkylene glycol function grafted onto at least one ethylenically unsaturated monomer, an intrinsic viscosity less than or equal to 100 ml/g determined in accordance with the method described in the rest of the description and known as the intrinsic viscosity method, makes it possible to increase the gloss, particularly the gloss of the paper sheet irrespective of the viewing angle, i.e. an angle of between 20° and 85°, and more particularly between 45° and 75°.

In this manner, the use in accordance with the invention of a weakly ionic and water-soluble copolymer as gloss activator, particularly as activator of the gloss of the paper sheet, irrespective of the viewing angle, i.e. an angle of between 20° and 85°, and more particularly between 45° and 75°, is characterized in that the copolymer has at least one alkoxy or hydroxy polyalkylene glycol function grafted onto at least one ethylenically unsaturated monomer, and in that said copolymer has an intrinsic viscosity less than or equal to 100 ml/g, determined in accordance with the method known as the intrinsic viscosity method The intrinsic viscosity of the copolymer is determined in accordance with the method described in Vollmert publication "Outlines of macromolecular chemistry" volume III, Vollmert Verlag, Karlsruhe 1985 and by the implementation of a solution of demineralized water and a capillary tube defined in standard DIN 53101/0a, of constant 0.005 and diameter equal to 0.53 mm. This method will be referred to as the intrinsic viscosity method in this application.

A second method that can be used to determine the intrinsic viscosity uses a 6% solution of NaCl and the same equipment as described above.

In the examples where this second method is used in addition to the first method, the intrinsic viscosity values obtained using this second method correspond to the second value indicated.

More specifically, the Applicant found that the presence in said copolymer of at least one monomer of formula (I):

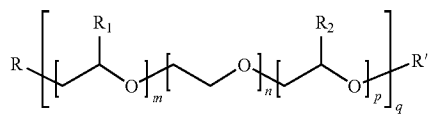

where
m and p represent a number of alkylene oxide units less than or equal to 150
n represents a number of ethylene oxide units less than or equal to 150
q represents a number equal to at least 1 and such that $5 \leq (m+n+p)q \leq 150$,
$R_1$ represents hydrogen or the methyl or ethyl radical
$R_2$ represents hydrogen or the methyl or ethyl radical
R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
R' represents hydrogen or a hydrocarbon radical having from 1 to 40 carbon atoms, made it possible to develop weakly ionic and water-soluble copolymers having at least one alkoxy or hydroxy polyalkylene glycol function grafted onto at least one ethylenically unsaturated monomer, thereby improving the gloss, in particular the gloss of the paper sheet irrespective of the viewing angle, i.e. an angle of between 20° and 85°, and more particularly between 45° and 75°.

Thus, according to the invention, said weakly ionic and water-soluble copolymer comprises:
a) at least one anionic monomer with a carboxylic or dicarboxyl or phosphoric or phosphonic or sulfonic function or a mixture thereof,
b) at least one non-ionic monomer, the non-ionic monomer consisting of at least one monomer of formula (I):

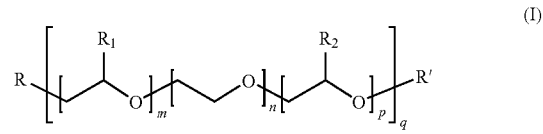

where
m and p represent a number of alkylene oxide units less than or equal to 150
n represents a number of ethylene oxide units less than or equal to 150
q represents an integer equal to at least 1 and such that $5 \leq (m+n+p)q \leq 150$, and preferably such that $15 \leq (m+n+p)q \leq 120$,
$R_1$ represents hydrogen or the methyl or ethyl radical
$R_2$ represents hydrogen or the methyl or ethyl radical
R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms,
or a mixture of several monomers of formula (I),
c) possibly, at least one monomer of the acrylamide or methacrylamide type or their derivatives such as N-[3-(dimethylamino)propyl]acrylamide or N-[3-(dimethylamino)propyl]methacrylamide, and their mixtures, or even at least one non water-soluble monomer such as the alkyl acrylates or methacrylates, unsaturated esters such as N-[2-(dimethylamino)ethyl]methacrylate, or N-[2-(dimethylamino)ethyl]acrylate, vinyls such as vinyl acetate, vinylpyrrolidone, styrene, alphamethylstyrene and their derivatives, or at least one cationic monomer or quaternary ammonium such as [2-(methacryloyloxy) ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or at least one organofluorinated or organosilylated monomer, or a mixture of several of these monomers, d) possibly at least one monomer having at least two ethylenic insaturations referred to as the crosslinking monomer in the rest of the application, the total of the proportions of components a), b), c), and d) being equal to 100%, and having an intrinsic viscosity less than or equal to 100 ml/g determined in accordance with the method known as the intrinsic viscosity method.

Said copolymer brought about an improvement in the gloss, in particular in the gloss of the papers, irrespective of the viewing angle, i.e. an angle of between 20° and 85°, and more particularly between 45° and 75°.

This aim is attained thanks to the use of a weakly ionic and water-soluble copolymer comprising:

a) at least one ethylenically unsaturated anionic monomer with a monocarboxyl or dicarboxyl or sulfonic or phosphoric or phosphonic function or a mixture thereof, b) at least one non-ionic monomer of formula (I), c) possibly, at least one monomer of the acrylamide or methacrylamide type or their derivatives such as N-[3-(dimethylamino)propyl]acrylamide or N-[3-(dimethylamino)propyl]methacrylamide, and their mixtures, or even at least one non water-soluble monomer such as the alkyl acrylates or methacrylates, unsaturated esters such as N-[2-(dimethylamino)ethyl]methacrylate, or N-[2-(dimethylamino)ethyl]acrylate, vinyls such as vinyl acetate, vinylpyrrolidone, styrene, alphamethylstyrene and their derivatives, or at least one cationic monomer or quaternary ammonium such as [2-(methacryloyloxy) ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or at least one organofluorinated or organosilylated monomer, or a mixture of several of these monomers, d) possibly, at least one crosslinking monomer, the total of the proportions of components a), b), c) and d) being equal to 100%.

The use, in accordance with the invention, of a weakly ionic and water-soluble copolymer, having at least one alkoxy or hydroxy polyalkylene glycol function grafted onto at least one ethylenically unsaturated monomer leading to an improvement in the gloss irrespective of the viewing angle, i.e. an angle of between 20° and 85°, and more particularly between 45° and 75°, in particular the gloss of the paper sheet, is characterized in that said weakly ionic and water-soluble copolymer comprises:

a) at least one ethylenically unsaturated anionic monomer having a monocarboxyl function selected from among the ethylenically unsaturated monomers having a monocarboxyl function such as acrylic or methacrylic acid or hemiesters of diacids such as $C_1$ to $C_4$ monoesters of maleic or itaconic acid, or mixture thereof, or having a dicarboxyl function selected from among the ethylenically unsaturated monomers having a dicarboxyl function such as crotonic, isocrotonic, cinnamic, itaconic, maleic acid, or anhydrides of carboxyl acids, such as maleic anhydride or having a sulfonic function selected from among the ethylenically unsaturated monomers having a sulfonic function such as acrylamido-methylpropane-sulfonic acid, sodium methallylsulfonate, vinylsulfonic acid and styrenesulfonic acid or having a phosphoric function selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or having a phosphonic function selected from among the ethylenically unsaturated monomers having a phosphonic function such as vinylphosphonic acid, or mixture thereof, b) at least one non-ionic ethylenically unsaturated monomer of formula (1):

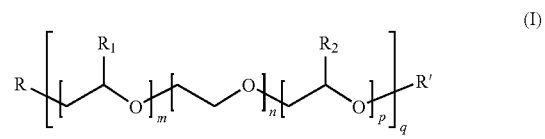

where m and p represent a number of alkylene oxide units less than or equal to 150 n represents a number of ethylene oxide units less than or equal to 150 q represents an integer equal to at least 1 and such that $5 \leq (m+n+p)q \leq 150$, and preferably such that $15 \leq (m+n+p)q \leq 120$, $R_1$ represents hydrogen or the methyl or ethyl radical $R_2$ represents hydrogen or the methyl or ethyl radical R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (I), c) possibly, at least one monomer of the acrylamide or methacrylamide type or their derivatives such as N-[3-(dimethylamino)propyl]acrylamide or N-[3-(dimethylamino)propyl]methacrylamide, and their mixture, or at least one non water-soluble monomer such as the alkyl acrylates or methacrylates, unsaturated esters such as N-[2-(dimethylamino)ethyl]methacrylate, or N-[2-(dimethylamino)ethyl]acrylate, vinyls such as vinyl acetate, vinylpyrrolidone, styrene, alphamethylstyrene and their derivatives, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or at least one organofluorinated or at least one organosilylated monomer, chosen preferably from among molecules of formula (IIa) or (IIb), with formula (IIa)

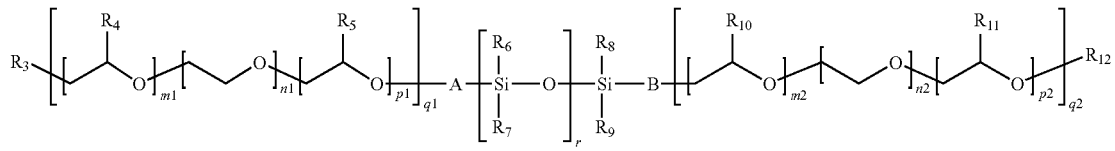

where
- m1, p1, m2 and p2 represent a number of alkylene oxide units less than or equal to 150
- n1 and n2 represent a number of ethylene oxide units less than or equal to 150
- q1 and q2 represent a whole number equal to at least 1 and such that $0 \leq (m1+n1+p1)q1 \leq 150$ and $0 \leq (m2+n2+p2)q2 \leq 150$,
- r represents a number such that $1 \leq r \leq 200$,
- $R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dmethyl-isopropenyl-benzylurethane and allylurethane, and to the group of allyl or vinyl ethers, whether or not substituted, or to the group of ethylenically unsaturated amides or imides,
- $R_4$, $R_5$, $R_{10}$ and $R_{11}$ represent hydrogen or the methyl or ethyl radical
- $R_6$, $R_7$, $R_8$ and $R_9$ represent straight or branched alkyl, aryl, alkylaryl or arylalkyl groups having from 1 to 20 carbon atoms, or a mixture thereof
- $R_{12}$ represents a hydrocarbon radical having from 1 to 40 carbon atoms,
- A and B are groups which may be present, in which case they represent a hydrocarbon radical having from 1 to 4 carbon atoms, with formula (IIb)

R-A-Si(OB)$_3$ where
- R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- A is a group which may be present, in which case it represents a hydrocarbon radical having from 1 to 4 carbon atoms,
- B represents a hydrocarbon radical having from 1 to 4 carbon atoms, or a mixture of several of said monomers, d) possibly, at least one crosslinking monomer selected, but not exclusively, from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, allyl ethers prepared from polyols such as pentaerythritol, sorbitol, sucrose or others, or selected from the molecules of formula (III):

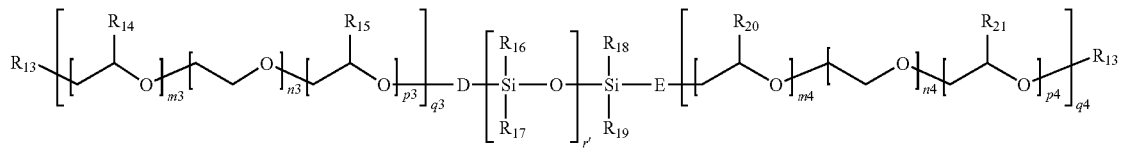

(III)

where
- m3, p3, m4 and p4 represent a number of alkylene oxide units less than or equal to 150
- n3 and n4 represent a number of ethylene oxide units less than or equal to 150
- q3 and q4 represent an integer equal to at least 1 and such that $0 \leq (m3+n3+p3)q3 \leq 150$ and $0 \leq (m4+n4+p4)q4 \leq 150$,
- r' represents a number such that $1 \leq r' \leq 200$,
- $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, $R_{14}$, $R_{15}$, $R_{20}$ and $R_{21}$ represent hydrogen or the methyl or ethyl radical $R_{16}$, $R_{17}$, $R_{18}$ and $R_{19}$ represent straight or branched alkyl, aryl, alkylaryl or arylalkyl groups having from 1 to 20 carbon atoms, or a mixture thereof D and E are groups which may be present, in which case they represent a hydrocarbon radical having from 1 to 4 carbon atoms, or a mixture of several of said monomers, the total of the proportions of components a), b), c) and d) being equal to 100%.

and in that said copolymer has an intrinsic viscosity less than or equal to 100 ml/g determined in accordance with the method known as the intrinsic viscosity method.

More particularly, the use of the above-mentioned copolymer is characterized in that said copolymer consists, in terms of weight, of:

a) from 2% to 95% and, even more particularly, from 5% to 90% of at least one ethylenically unsaturated anionic monomer having a monocarboxyl function selected from among the ethylenically unsaturated monomers having a monocarboxyl function such as acrylic or methacrylic acid or hemiesters of diacids such as $C_1$ to $C_4$ monoesters of maleic or itaconic acid, or mixture thereof, or having a dicarboxyl function selected from among the ethylenically unsaturated monomers having a dicarboxyl function such as crotonic, isocrotonic, cinnamic, itaconic, maleic acid, or anhydrides of carboxyl acids, such as maleic anhydride or having a sulfonic function selected from among the ethylenically unsaturated monomers having a sulfonic function such as acrylamido-methyl-propane-sulfonic acid, sodium methallylsulfonate, vinylsulfonic acid and styrenesulfonic acid or having a phosphoric function selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or having a phosphonic function selected from among the ethylenically unsaturated monomers having a phosphonic function such as vinylphosphonic acid, or mixture thereof, b) from 2% to 95%, and even more particularly, from 5% to 90% of at least one non-ionic ethylenically unsaturated monomer of formula (I):

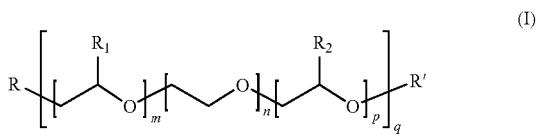

where
m and p represent a number of alkylene oxide units less than or equal to 150 n represents a number of ethylene oxide units less than or equal to 150 q represents an integer equal to at least 1 and such that $5 \leq (m+n+p)q \leq 150$, and preferably such that $15 \leq (m+n+p)q \leq 120$, $R_1$ represents hydrogen or the methyl or ethyl radical $R_2$ represents hydrogen or the methyl or ethyl radical R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (I), c) from 0% to 50% of at least one monomer of the acrylamide or methacrylamide type or their derivatives such as N-[3-(dimethylamino)propyl]acrylamide or N-[3-(dimethylamino)propyl]methacrylamide, and their mixture, or at least one non water-soluble monomer such as the alkyl acrylates or methacrylates, unsaturated esters such as N-[2-(dimethylamino)ethyl]methacrylate, or N-[2-(dimethylamino)ethyl]acrylate, vinyls such as vinyl acetate, vinylpyrrolidone, styrene, alphamethylstyrene and their derivatives, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or an organofluorinated or at least one organosilylated monomer, chosen preferably from among molecules of formula (IIa) or (IIb), with formula (IIa)

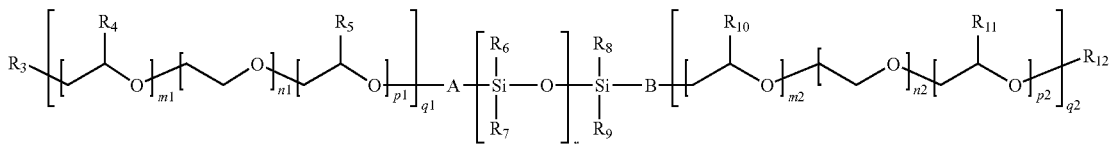

where
- m1, p1, m2 and p2 represent a number of alkylene oxide units less than or equal to 150
- n1 and n2 represent a number of ethylene oxide units less than or equal to 150

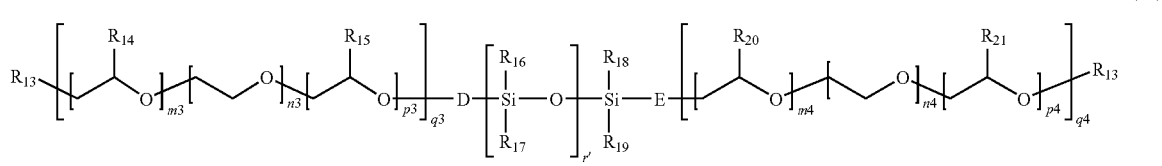

(III)

- q1 and q2 represent an integer equal to at least 1 and such that $0 \leq (m1+n1+p1)q1 \leq 150$ and $0 \leq (m2+n2+p2)q2 \leq 150$,
- r represents a number such that $1 \leq r \leq 200$,
- $R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenylbenzylurethane and allylurethane, and to the group of allyl or vinyl ethers, whether or not substituted, or to the group of ethylenically unsaturated amides or imides,
- $R_4$, $R_5$, $R_{10}$ and $R_{11}$ represent hydrogen or the methyl or ethyl radical
- $R_6$, $R_7$, $R_8$ and $R_9$ represent straight or branched alkyl, aryl, alkylaryl or arylalkyl groups having from 1 to 20 carbon atoms, or a mixture thereof
- $R_{12}$ represents a hydrocarbon radical having from 1 to 40 carbon atoms,
- A and B are groups which may be present, in which case they represent a hydrocarbon radical having from 1 to 4 carbon atoms, with formula (IIb)

R-A-Si(OB)$_3$ where
- R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenylbenzylurethane and allylurethane, and to the group of allyl or vinyl ethers, whether or not substituted, or to the group of ethylenically unsaturated amides or imides,
- A is a group which may be present, in which case it represents a hydrocarbon radical having from 1 to 4 carbon atoms,
- B represents a hydrocarbon radical having from 1 to 4 carbon atoms, or a mixture of several of said monomers, d) from 0% to 3% of at least one crosslinking monomer selected, but not exclusively, from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, allyl ethers prepared from polyols such as pentaerythritol, sorbitol, sucrose or others, or selected from the molecules of formula (III):

where
- m3, p3, m4 and p4 represent a number of alkylene oxide units less than or equal to 150
- n3 and n4 represent a number of ethylene oxide units less than or equal to 150
- q3 and q4 represent an integer equal to at least 1 and such that $0 \leq (m3+n3+p3)q3 \leq 150$ and $0 \leq (m4+n4+p4)q4 \leq 150$,
- r' represents a number such that $1 \leq r' \leq 200$,
- $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenylbenzylurethane and allylurethane, and to the group of allyl or vinyl ethers, whether or not substituted, or to the group of ethylenically unsaturated amides or imides,
- $R_{14}$, $R_{15}$, $R_{20}$ and $R_{21}$ represent hydrogen or the methyl or ethyl radical
- $R_{16}$, $R_{17}$, $R_{18}$ and $R_{19}$ represent straight or branched alkyl, aryl, alkylaryl or arylalkyl groups having from 1 to 20 carbon atoms, or a mixture thereof
- D and E are groups which may be present, in which case they represent a hydrocarbon radical having from 1 to 4 carbon atoms, or a mixture of several of said monomers, the total of the proportions of components a), b), c) and d) being equal to 100%.

and in that said copolymer has an intrinsic viscosity less than or equal to 100 ml/g determined in accordance with the method known as the intrinsic viscosity method.

The water-soluble, and preferably weakly ionic and water-soluble, copolymer used according to the invention is obtained by known radical copolymerization method in solution, in direct or inverse emulsion, in suspension or precipitation in appropriate solvents, in the presence of known catalytic systems and transfer agents, or by means of controlled radical polymerization method such as the method known as Reversible Addition Fragmentation Transfer (RAFT), the method known as Atom Transfer Radical Polymerization (ATRP), the method known as Nitroxide Mediated Polymerization (NMP) or the method known as Cobaloxime Mediated Free Radical Polymerization.

When polymerization is completed, this copolymer may be distilled, and its carboxyl functions may be fully or partially neutralized by one or more neutralizing agents having a monovalent neutralizing function or a polyvalent neutralizing function such as, for example, for the monovalent function, those chosen from the group consisting of the alkaline cations, in particular sodium, potassium, lithium, ammonium or the primary, secondary or tertiary aliphatic and/or cyclic amines such as for example stearylamine, the ethanolamines (mono-, di-, triethanolamine), mono and diethylamine, cyclohexylamine, methylcyclohexylamine, aminomethylpropanol, morpholine or, for the polyvalent function, those chosen from the group consisting of alkaline earth divalent cations, in particular magnesium and calcium, or zinc, and of the trivalent cations, including in particular aluminium, or of certain cations of higher valency.

Each neutralizing agent then operates according to neutralization rates specific to each valency function.

According to another variant, the copolymer obtained from the copolymerization reaction may, before or after the total or partial neutralization reaction, be treated and separated into several phases, according to statistical or dynamic method known to the skilled man in the art, by one or more polar solvents belonging to the group consisting of water, methanol, ethanol, propanol, isopropanol, butanols, acetone, tetrahydrofurane or their mixtures.

One of the phases then corresponds to the copolymer used according to the invention as gloss enhancement agent.

The invention also relates to said weakly ionic and water-soluble copolymer having at least one alkoxy or hydroxy polyalkylene glycol function grafted onto at least one ethylenically unsaturated monomer making it possible to enhance the gloss of papers, paints and plastics.

Thus, according to the invention, the gloss activator irrespective of the viewing angle, i.e. an angle of between 20° and 85°, and more particularly between 45° and 75°, is characterized in that it is the above-mentioned water-soluble, preferably weakly ionic and water-soluble, copolymer.

The invention also relates to the dispersion method that implements said copolymer.

This dispersion method according to the invention is characterized in that use is made of said copolymer, and, in particular, in that use is made of 0.05% to 5% by dry weight of said copolymer with respect to the dry weight of the fillers and/or pigments, and, more particularly, in that use is made of 0.1% to 2.5% by dry weight of said copolymer with respect to the dry weight of the fillers and/or pigments.

This dispersion method in aqueous suspension of mineral matter according to the invention is characterized in that the mineral matter is selected from among calcium carbonate, dolomites, kaolin, calcine kaolin, talc, gypsum, titanium oxide, satin white or aluminium trihydroxide, mica and the mixture of these fillers, such as talc-calcium carbonate or calcium carbonate-kaolin, or mixtures of calcium carbonate with aluminium trihydroxide, or mixtures with synthetic or natural fibres or co-structures of minerals such as talc-calcium carbonate or talc-titanium dioxide co-structures, and is more particularly calcium carbonate such as natural calcium carbonate selected from among marble, calcite, chalk or their mixtures.

The invention also relates to the grinding method that implements said copolymer.

This grinding method in aqueous suspension of mineral matter according to the invention is characterized in that use is made of said copolymer, and, in particular, in that use is made of 0.05% to 5% by dry weight of said copolymer with respect to the dry weight of the fillers and/or pigments, and, more particularly, in that use is made of 0.1% to 2.5% by dry weight of said copolymer with respect to the dry weight of the fillers and/or pigments.

This grinding method in aqueous suspension of mineral matter according to the invention is characterized in that the mineral matter is selected from among calcium carbonate, dolomites, kaolin, calcine kaolin, talc, gypsum, titanium oxide, satin white or aluminium trihydroxide, mica and the mixture of these fillers, such as talc-calcium carbonate or calcium carbonate-kaolin, or mixtures of calcium carbonate with aluminium trihydroxide, or mixtures with synthetic or natural fibres or co-structures of minerals such as talc-calcium carbonate or talc-titanium dioxide co-structures, and is more particularly of calcium carbonate such as natural calcium carbonate selected from among marble, calcite, chalk or their mixtures.

The aqueous suspensions of fillers and/or pigments dispersed and/or ground according to the invention are characterized in that they contain said copolymer and more particularly in that they contain 0.05% to 5% by dry weight of said copolymer with respect to the total dry weight of the fillers and/or pigments, and more particularly still 0.1% to 2.5% by dry weight of said agent with respect to the total dry weight of the fillers and/or pigments.

They are also characterized in that the mineral matter is selected from among calcium carbonate, dolomites, kaolin, calcine kaolin, talc, gypsum, titanium oxide, satin white or aluminium trihydroxide, mica and the mixture of these fillers, such as talc-calcium carbonate or calcium carbonate-kaolin, or mixtures of calcium carbonate with aluminium trihydroxide, or mixtures with synthetic or natural fibres or co-structures of minerals such as talc-calcium carbonate or talc-titanium dioxide co-structures, and is more particularly of calcium carbonate such as natural calcium carbonate selected from among marble, calcite, chalk or their mixtures.

The invention also relates to the use of said mineral matter aqueous suspensions according to the invention in the paper manufacturing industry and more specifically in paper coating.

The coating colours according to the invention are characterized in that they contain said copolymer and more particularly in that they contain 0.05% to 5% by dry weight of said copolymer with respect to the total dry weight of the fillers and/or pigments, and more particularly 0.1% to 2.5% by dry weight of said copolymer with respect to the total dry weight of the fillers and/or pigments.

The coated papers according to the invention are characterized in that they contain said copolymer.

It is to be noted that a glossy coating pigment can be used as pigment in filling with less influence on filler retention that an equally refined pigment dispersed using a polyacrylate.

Compositions of paint and of plastics according to the invention are characterized in that they contain said copolymer.

The scope and interest of the invention will be better perceived thanks to the following examples, which are not of a comprehensive nature.

EXAMPLE 1

This example relates to the use of copolymers according to the invention in a mineral filler grinding method. It also relates to the use of the suspensions thus obtained in the manufacture of paper coating colours, said coating colours being used to coat papers. This example also relates to the measurement of the gloss of the papers obtained. In this example for tests 1 and 2, the support paper used is a paper pre-coated with a calcium carbonate marketed by Omya under the name Covercarb™ 60ME. This support has the following characteristics:
- a specific weight equal to 82 g/m² as measured as per standard 1301 ISO 536
- a whiteness $R_{457+UV}$ equal to 96% measured as per standard ISO 2470
- a whiteness $R_{457-UV}$ equal to 87% measured as per standard ISO 2470
- an opacity equal to 89.5% measured as per standard DIN 53 146
- a roughness equal to 4.8 μm measured as per standard ISO 8791-4

Test No. 1

This test illustrates the prior art and implements a suspension of ground calcium carbonate with 0.9% by weight with respect to the dry weight of calcium carbonate, of sodium and magnesium polyacrylate of an intrinsic viscosity equal to 7.8 ml/g according to the above-mentioned intrinsic viscosity method, and of a grain size such that 97% by weight of the particles have a diameter of less than 2 μm and 81% in weight of the particles have a diameter of less than 1 μm measured on the Sédigraph™ 5100.

This calcium carbonate has a PDDPC cationic polymer demand equal to 33990 μVal/kg, said cationic polymer demand being measured using the Mettler DL 77 titrator and the Mütec PCD 02 detector by means of the cationic titration method that uses 0.005 mole of a 20% solution of poly(N,N-dimethyl-3,5-dimethylene-piperidium (PDDPC) chloride sold by Acros Organics.

Said suspension will then enter into the composition of the coating colour to be tested, consisting of:
- 80 parts by dry weight of the calcium carbonate aqueous suspension to be tested,
- 5 parts by dry weight of a coarser calcium carbonate slurry,
- 15 parts of delaminated kaolin
- 9.5 parts of binder
- 0.32 parts of carboxymethyl cellulose,
- 0.6 parts of polyvinyl alcohol
- 0.15 parts of optical brightener, and
- 0.4 parts of calcium stearate and prepared to 68% dry matter concentration, as follows.

In a recipient containing 20 kg of water and 0.125 kg of a sodium polyacrylate with dry matter concentration equal to 42% and intrinsic viscosity equal to 6.2 ml/g as per the above-mentioned intrinsic viscosity method, 22.5 kg of an aqueous suspension, of 78.2% dry matter concentration, of coarser calcium carbonate marketed by Omya under the name Hydrocarb™ 60, and 356.5 kg of an aqueous suspension, with 78.5% dry matter concentration, of the calcium carbonate suspension to be tested are mixed.

Once the calcium carbonates have been mixed, 52.5 kg of a delaminated kaolin marketed by Kaolin International B.V. under the name Amazon™ 88 are added while stirring at an average speed.

Stirring is continued at average speed for 15 minutes and, following visual verification of whether or not agglomerates are present, stirring is continued until the few agglomerates disappear, or is stopped if there are no agglomerates.

7.5 kg of a 15% aqueous solution of carboxymethyl cellulose previously dissolved for at least 20 minutes at least 90° C. and marketed by Noviant under the name CMC Firmfix™ 10 are then added.

8.4 kg of a 25% aqueous solution of polyvinyl alcohol previously dissolved for at least 20 minutes at least 90° C. and marketed by Clariant under the name Mowiol™ 4-98 are then added.

28 kg of a 50% by weight aqueous dispersion of styrene-butadiene marketed by Dow Europe under the name Dow Latex DL 940 and 38.5 kg of a 50% by weight aqueous dispersion of an acrylic ester copolymer marketed by BASF under the name Acronal™ S 360 D are then added as binder.

Finally, 1.9 kg of optical brightener in the form of an aqueous derivative of 4.4-diaminostilbene-2,2-disulfonic acid marketed by Bayer under the name Blancophor™ P and 2.8 kg of a 50% concentration by dry weight aqueous dispersion of a calcium stearate sold by Henkel-Nopco AS under the name Nopcote™ C-104 are added.

Once these additions are made, stirring is maintained for another 15 minutes.

The pH of the coating colour is then checked and brought to a value of approximately 9 by means of a 10% soda solution.

The dry matter content of the coating colour is also checked and brought to a value of approximately 68.5% by adding water if necessary.

The Brookfield™ viscosity of the coating colour obtained as measured at 32° C. using the Brookfield™ DV-II+ model viscometer fitted with the corresponding spindle is equal to 6100 mPa.s at 20 min$^{-1}$ and 1800 mPa.s at 100 min$^{-1}$.

The coating colour obtained is used to coat the above-mentioned sheets of support paper using a Combiblades pilot coater from Jagenberg GmbH fitted with a 0.457 mm thick blade.

A "long dwell" head is used with a blade angle of 45°. The coating speed is 1000 m/s and the average coating deposited is 11 g/m² on each surface of the paper.

The relative humidity obtained for each paper is of the order of 4.2% to 4.6% weight for weight.

The paper thus coated is then calendered using a supercalender with 9 contact zones between the ten rollers, marketed by Keinewefers.

The iron calendering diameter is 180 mm and 270 mm with respect to the cotton.

The supercalendering is determined by the measurement of the ISO 2813 20°, 60° and 85° gloss of the coated paper, which consists in passing the coated and calendered paper sheet in the BYK-Gardner "haze gloss" laboratory glossmeter on paper with glass support.

Once this gloss measurement is made, the paper samples are cut into DIN A3 format and are conditioned in an air conditioned room as per standard DIN EN 20187 to determine the 45° DIN, 75° DIN (DIN 54 502) and 75° TAPPI gloss values.

The values of the various glosses are given in table 1 at the end of test 2.

Test No. 2

This test illustrates the invention and implements, as a grinding aid agent, 1.8% by dry weight, with respect to the dry weight of calcium carbonate, of a copolymer consisting, by weight, of:
- a) 3.0% acrylic acid and 2.0% maleic acid
- b) 94.0% of a monomer of formula (I) in which
    $R_1$ represents hydrogen
    $R_2$ represents hydrogen
    R represents the vinyl group
    R' represents the methyl radical
    where m=p=0; n=114; q=1 and (m+n+p)q=114 c) 1.0% of a monomer of formula (IIb) in which
R represents the methacrylate group
A represents the propyl radical
B represents the methyl radical
of intrinsic viscosity equal to 39.5 ml/g according to the above-mentioned intrinsic viscosity method (and equal to 30.3 ml/g according to the second method) to obtain by grinding in two stages, a suspension of calcium carbonate with 74.7% by weight of dry matter and of grain size such that 98% by weight of the particles have a diameter of less than 2 µm and 78% by weight of the particles have a diameter of less than 1 µm measured on the Sédigraph™ 5100.

This two-stage grinding method consists in grinding, during the first stage, a suspension of calcium carbonate of initial average diameter equal to 5 µm measured using the Sédigraph™ 5100 particle size analyzer in an aqueous suspension of calcium carbonate to a grain size such that 62% by weight of the particles have a diameter of less than 2 µm and 37% by weight of the particles have a diameter of less than 1 µm measured using the Sédigraph™ 5100, then in grinding this suspension until the desired final grain size is obtained.

When grinding is completed, the Brookfield™ viscosity of the suspension is measured using a model RVT Brookfield™ viscometer, at a temperature of 23° C. and a speed of rotation of 100 rpm with the appropriate spindle.

This gives a Brookfield™ viscosity equal to 750 mPa.s.

One hour after the end of grinding, a sample of the pigmentary suspension, the grain size of which (98% by weight of the particles have a diameter of less than 2 µm and 78% by weight of the particles have a diameter of less than 1 µm) is measured using a Sedigraph™ 5100 particle size analyzer, is recovered in a beaker.

Having left this sample lie in the beaker for 7 days, the Brookfield™ viscosity of the suspension is measured by introducing, after stirring the beaker for 5 minutes, the appropriate spindle of the RVT model Brookfield™ viscometer, at a temperature of 23° C. and a speed of rotation of 100 rpm. This gives a value of 680 mPa.s which constitutes the Brookfield™ viscosity value known as Brookfield™ APAG (after stirring) viscosity.

The BET specific surface area of the pigment obtained, determined according to standard ISO 9277, is equal to 7.5 $m^2/g$ The cationic demand of the pigment obtained, determined according to the above-mentioned PDDPC method, is equal to 3850 µVal/kg.

Said suspension will then enter into the composition of the coating colour to be tested, consisting of:
80 parts by dry weight of the calcium carbonate aqueous suspension to be tested,
5 parts by dry weight of a coarser calcium carbonate slurry,
15 parts of delaminated kaolin
9.5 parts of binder
0.32 parts of carboxymethyl cellulose,
0.6 parts of polyvinyl alcohol
0.15 parts of optical brightener, and
0.4 parts of calcium stearate
and prepared to 68% dry matter concentration, as follows.

In a recipient containing 20 kg of water and 0.125 kg of a sodium polyacrylate with dry matter concentration equal to 42% and intrinsic viscosity equal to 6.2 ml/g as per the above-mentioned intrinsic viscosity method, 22.5 kg of an aqueous suspension, of 78.2% dry matter concentration, of coarser calcium carbonate marketed by Omya under the name Hydrocarb™ 60, and 375 kg of the aqueous suspension to be tested of calcium carbonate as per the invention obtained previously at 74.7% dry matter concentration.

Once the calcium carbonates have been mixed, 52.5 kg of a delaminated kaolin marketed by Kaolin International B.V. under the name Amazon™ 88 are added while stirring at an average speed.

Stirring is continued at average speed for 15 minutes and, following visual verification of whether or not agglomerates are present, stirring is continued until the few agglomerates disappear, or is stopped if there are no agglomerates.

7.5 kg of a 15% aqueous solution of carboxymethyl cellulose previously dissolved for at least 20 minutes at least 90° C. C and marketed by Noviant under the name CMC Finnfix™ 10 are then added.

8.4 kg of a 25% aqueous solution of polyvinyl alcohol previously dissolved for at least 20 minutes at least 90° C. C and marketed by Clariant under the name Mowiol™ 4-98 are then added.

28 kg of a 50% by weight aqueous dispersion of styrene-butadiene marketed by Dow Europe under the name Dow Latex DL 940 and 38.5 kg of a 50% by weight aqueous dispersion of an acrylic ester copolymer marketed by BASF under the name Acronal™ S 360 D are then added as binder.

Finally, 1.9 kg of optical brightener in the form of an aqueous derivative of 4.4-diaminostilbene-2,2-disulfonic acid marketed by Bayer under the name Blancophor™ P and 2.8 kg of a 50% concentration by dry weight aqueous dispersion of a calcium stearate sold by Henkel-Nopco AS under the name Nopcote™ C-104 are added.

Once these additions are made, stirring is maintained for another 15 minutes.

The pH of the coating colour is then checked and brought to a value of approximately 9 by means of a 10% soda solution.

The dry matter content of the coating colour is also checked and brought to a value of approximately 68.5% by adding water if necessary.

The Brookfield™ viscosity of the coating colour obtained as measured at 32° C. using the Brookfield™ DV-II+ model viscometer fitted with the corresponding spindle is equal to 3600 mPa.s at 20 $min^{-1}$ and 1200 mPa.s at 100 $min^{-1}$.

The coating colour obtained is used to coat the above-mentioned sheets of support paper using a Combiblades pilot coater from Jagenberg GmbH fitted with a 0.457 mm thick blade following the same procedure and using the same equipment as in test No. 1.

As the paper is coated and calendered following the same procedure and using the same equipment as in test No. 1, the 45° DIN, 75° DIN (DIN 54 502) and 75° TAPPI gloss values are determined following the same procedure and using the same equipment as in test No. 1.

The various gloss values are given in the following table 1.

TABLE 1

|  | Standard used | Unit | Prior art Test No. 1 | Invention Test No. 2 |
|---|---|---|---|---|
| coated paper | DIN EN ISO 536 | $g/m^2$ | 102 | 105 |
| (75° TAPPI) OS gloss | TAPPI | % | 75 | 80 |
| (75° TAPPI) SS gloss | TAPPI | % | 77 | 82 |
| (75° DIN) OS gloss | DIN 54 502 | % | 46 | 50 |
| (75° DIN) SS gloss | DIN 54 502 | % | 48 | 54 |
| (45° DIN) OS gloss | DIN 54 502 | % | 17 | 23 |
| (45° DIN) SS gloss | DIN 54 502 | % | 19 | 28 |
| (PPS) 1.0 soft OS roughness | ISO 8791-4 | µm | 0.610 | 0.579 |
| (PPS) 1.0 soft SS roughness | ISO 8791-4 | µm | 0.608 | 0.530 |

OS = Upper surface (Oberseite)
SS = Fabric side or rear side (Siebseite)

It can be observed from the table that the paper coated with coating colours containing aqueous suspensions of natural calcium carbonate according to the invention have a higher gloss irrespective of the viewing angle, i.e. an angle of between 20° and 85°, more particularly between 45° and 75°, and lower coarseness than paper coated with the standard coating colours of the prior art.

EXAMPLE 2

This example relates to the use of copolymers according to the invention in another mineral filler grinding method. It also relates to the use of the suspensions thus obtained in the manufacture of paper coating colours, said coating colours being used to coat papers. This example also relates to the measurement of the gloss of the papers obtained.

Test No. 3

This test illustrates the prior art and implements the ground calcium carbonate suspension of test No. 1 with grain size such that 97% by weight of the particles have a diameter of less than 2 μm and 81% by weight of the particles have a diameter of less than 1 μm measured on the Sédigraph™ 5100.

Said suspension is diluted to a concentration equal to 50% by dry matter, and then mixed, in a 50:6 ratio, with a 50% aqueous dispersion by weight of an acrylic ester copolymer marketed by BASF under the name Acronal™ S 360 D.

The coating colour thus obtained is then used to coat sheets of Synteape support paper using an Erichsen coater.

The paper thus coated is then calendered 4 times using a Dixon model 8000 calenderer the paper samples of which are cut into DIN A3 format and are conditioned in an air conditioned room as per standard DIN EN 20187 to determine the 20°, 60°, and 85° ISO 2813 gloss values using the gloss meter from BYK-Gardner.

The results obtained are:
Gloss at 20°=2.25
Gloss at 60°=28
Gloss at 85°=84.5

Test No. 4

This test illustrates the invention and implements 2.08% by dry weight, with respect to the dry weight of calcium carbonate, of a copolymer consisting, by weight, of:
a) 8.7% acrylic acid and 1.5% methacrylic acid
b) 89.4% of a monomer of formula (I) in which
  $R_1$ represents hydrogen
  $R_2$ represents hydrogen
  R represents the methacrylate group
  R' represents the methyl radical
  where m=p=0; n=114; q=1 and (m+n+p)q=114
c) 0.4% of a monomer of formula (IIb) in which
  R represents the methacrylate group
  A represents the propyl radical
  B represents the methyl radical
of intrinsic viscosity equal to 20.7 ml/g according to the above-mentioned intrinsic viscosity method, to obtain, from a calcium carbonate with a median diameter of 15 μm, an aqueous suspension of ground calcium carbonate having a dry matter concentration equal to 75% by weight and having a grain size such that 81% by weight of the particles have a diameter of less than 1 μm measured on the Sédigraph™ 5100.

To do this, use is made of a Dyno-Mill™ type fixed-cylinder grinder with rotating impeller, the grinding body of which consists of zirconium based beads with a diameter of between 0.6 millimetres and 1 millimetre.

The total volume occupied by the grinding body is 1000 cubic centimetres while its weight is 2700 g.

The grinding chamber has a volume of 1400 cubic centimetres.

The circumferential speed of the grinder is 10 metres per second.

The pigment suspension is recycled at a rate of 40 litres per hour.

The output of the Dyno-Mill™ is fitted with a 200-micron grade separator by means of which it is possible to separate the suspension resulting from the grinding and the grinding body.

The temperature during each grinding test is maintained at approximately 60° C.

When grinding is complete, the dry matter concentration is equal to 74.7% and the Brookfield™ viscosity of the suspension is measured using a model RVT type Brookfield™ viscometer, at a temperature of 23° C. and a speed of rotation of 100 rpm with the appropriate spindle.

This gives a Brookfield™ viscosity equal to 712 mPa.s.

Having left this sample lie in the beaker for 7 days, the Brookfield™ viscosity of the suspension is measured by introducing, into the unstirred beaker, the appropriate spindle of the RVT model Brookfield™ viscometer, at a temperature of 23° C. and a speed of rotation of 100 rpm. This gives a value of 2240 mPa.s which constitutes the Brookfield™ viscosity value known as Brookfield™ AVAG (before stirring) viscosity.

The same Brookfield™ viscosity measurements are also made once the beaker has been stirred for 5 minutes and constitute APAG (after stirring) viscosity results. The result obtained is 686 mPa.s.

Once these Brookfield™ viscosity measurements have been made, the cationic demand of the pigment obtained is determined.

This latter, determined according to the above-mentioned PDDPC method, is equal to 7050 μVal/kg.

The calcium carbonate slurry thus obtained is then diluted to 50% and then coloured, with a 50% by weight aqueous dispersion of an acrylic ester copolymer marketed by BASF under the name Acronal™ S 360 D, under the same conditions and the same ratio as test No. 3 in order to form a coating colour which is coated on the same support paper as that used in test No. 3.

The 20°, 60° and 85° ISO 2813 gloss values are measured, using a BYK-Gardner laboratory gloss meter, following a quadruple calendering performed under the same conditions and using the same equipment as in test No. 3.

The results obtained are:
Gloss at 20°=4.25
Gloss at 60°=44
Gloss at 85°=87.5

Test No. 5

This test illustrates the invention and implements 2.02% by dry weight, with respect to the dry weight of calcium carbonate, of a copolymer consisting, by weight, of:
a) 8.7% acrylic acid and 1.5% methacrylic acid
b) 89.5% of a monomer of formula (I) in which
  $R_1$ represents hydrogen
  $R_2$ represents hydrogen
  R represents the methacrylate group
  R' represents the methyl radical
  where m=p=0; n=114; q=1 and (m+n+p)q=114 c) 0.4% of a monomer of formula (IIb) in which
R represents the vinyl group
A is absent
B represents the methyl radical
of intrinsic viscosity equal to 20.4 ml/g according to the above-mentioned intrinsic viscosity method, to obtain, from a calcium carbonate with a median diameter of 15 µm, an aqueous suspension of ground calcium carbonate having a dry matter concentration equal to 75% by weight and having a grain size such that 83% by weight of the particles have a diameter of less than 1 µm measured on the Sédigraph™ 5100.

To do this, use is made of the same equipment and the same grinding procedure to obtain the calcium carbonate aqueous suspension.

The dry matter concentration and Brookfield™ viscosity results obtained using the same method as test No. 4 are as follows:
Dry matter concentration=74.3%
Viscosity $(T_0)$=613 mPa.s
AVAG viscosity $(T_{7\ days})$=3030 mPa.s
APAG viscosity $(T_{7\ days})$=650 mPa.s Once these Brookfield™ viscosity measurements have been made, the cationic demand of the pigment obtained is determined.

This latter, determined according to the above-mentioned PDDPC method, is equal to 7180 µVal/kg.

The calcium carbonate slurry thus obtained is then diluted to 50% and then mixed, with a 50% by weight aqueous dispersion of an acrylic ester copolymer marketed by BASF under the name Acronal™ S 360 D, under the same conditions and using the same ratio as test No. 3 in order to form a coating colour which is coated on the same support paper as that used in test No. 3.

The 20°, 60° and 85° ISO 2813 gloss values are measured, using a BYK-Gardner laboratory gloss meter, following a quadruple calendering performed under the same conditions and using the same equipment as in test No. 3.

The results obtained are:
Gloss at 20°=4.25
Gloss at 60°=46
Gloss at 85°=89

Test No. 6

This test illustrates the invention and implements 2.08% by dry weight, with respect to the dry weight of calcium carbonate, of a copolymer consisting, by weight, of:
a) 8.7% acrylic acid and 1.5% methacrylic acid
b) 87.0% of a monomer of formula (I) in which
$R_1$ represents hydrogen
$R_2$ represents hydrogen
R represents the methacrylate group
R' represents the methyl radical
where m=p=0; n=114; q=1 and (m+n+p)q=114
c) 3.0% of a monomer of formula (IIb) in which
R represents the methacrylate group
A represents the propyl group
B represents the methyl radical
of intrinsic viscosity equal to 23.2 ml/g according to the above-mentioned intrinsic viscosity method, to obtain, from a calcium carbonate with a median diameter of 15 µm, an aqueous suspension of ground calcium carbonate having a dry matter concentration equal to 75% by weight and having a grain size such that 81% by weight of the particles have a diameter of less than 1 µm measured on the Sédigraph™ 5100.

To do this, use is made of the same equipment and the same grinding procedure to obtain the calcium carbonate aqueous suspension.

The dry matter concentration and Brookfield™ viscosity results obtained using the same method as test No. 4 are as follows:
Dry matter concentration=77.0%
Viscosity $(T_0)$=648 mPa.s
AVAG viscosity $(T_{7\ days})$=2840 mPa.s
APAG viscosity $(T_{7\ days})$=747 mPa.s Once these Brookfield™ viscosity measurements have been made, the cationic demand of the pigment obtained is determined.

This latter, determined according to the above-mentioned PDDPC method, is equal to 6900 µVal/kg.

The calcium carbonate slurry thus obtained is then diluted to 50% and then mixed, with a 50% by weight aqueous dispersion of an acrylic ester copolymer marketed by BASF under the name Acronal™ S 360 D, under the same conditions and using the same ratio as test No. 3 in order to form a coating colour which is coated on the same support paper as that used in test No. 3.

The 20°, 60° and 85° ISO 2813 gloss values are measured, using a BYK-Gardner laboratory gloss meter, following a quadruple calendering performed under the same conditions and using the same equipment as in test No. 3.

The results obtained are:
Gloss at 20°=3.75
Gloss at 60°=43
Gloss at 85°=88.5

Test No. 7

This test illustrates the invention and implements 2.08% by dry weight, with respect to the dry weight of calcium carbonate, of a copolymer consisting, by weight, of:
a) 8.7% acrylic acid and 1.5% methacrylic acid
b) 87.0% of a monomer of formula (I) in which
$R_1$ represents hydrogen
$R_2$ represents hydrogen
R represents the methacrylate group
R' represents the methyl radical
where m=p=0; n=114; q=1 and (m+n+p)q=114
c) 3.0% of a monomer of formula (IIb) in which
R represents the vinyl group
A is absent
B represents the methyl radical
of intrinsic viscosity equal to 20.0 ml/g according to the above-mentioned intrinsic viscosity method, to obtain, from a calcium carbonate with a median diameter of 15 µm, an aqueous suspension of ground calcium carbonate having a dry matter concentration equal to 75% by weight and having a grain size such that 83% by weight of the particles have a diameter of less than 1 µm measured on the Sédigraph™ 5100.

To do this, use is made of the same equipment and the same grinding procedure to obtain the calcium carbonate aqueous suspension.

The dry matter concentration and Brookfield™ viscosity results obtained using the same method as test No. 4 are as follows:
Dry matter concentration=74.3%
Viscosity $(T_0)$=808 mPa.s
AVAG viscosity $(T_{7\ days})$=3000 mPa.s
APAG viscosity $(T_{7\ days})$=802 mPa.s Once these Brookfield™ viscosity measurements have been made, the cationic demand of the pigment obtained is determined.

This latter, determined according to the above-mentioned PDDPC method, is equal to 7710 µVal/kg.

The calcium carbonate slurry thus obtained is then diluted to 50% and then mixed with a 50% by weight aqueous dispersion of an acrylic ester copolymer marketed by BASF under the name Acronal™ S 360 D, under the same conditions and using the same ratio as test No. 3 in order to form a coating colour which is coated on the same support paper as that used in test No. 3.

The 20°, 60° and 85° ISO 2813 gloss values are measured, using a BYK-Gardner laboratory gloss meter, following a quadruple calendering performed under the same conditions and using the same equipment as in test No. 3.

The results obtained are:
Gloss at 20°=5.0
Gloss at 60°=46
Gloss at 85°=90.5

Test No. 8

This test illustrates the prior art and implements the calcium carbonate sold by Omya under the name Hydrocarb™ 90ME.

The 75° TAPPI gloss value is then measured, using a BYK-Gardner laboratory gloss meter, without any calendering after coating.

The result is: Gloss 75° TAPPI=27.3

Test No. 9

This test illustrates the invention and implements 1.21% by dry weight, with respect to the calcium carbonate dry weight, of a copolymer consisting, by weight, of:
a) 6.0% acrylic acid and 1.7% methacrylic acid
b) 87.2% of a monomer of formula (I) in which
  $R_1$ represents hydrogen
  $R_2$ represents hydrogen
  R represents the methacrylate group
  R' represents the methyl radical
  where m=p=0; n=113; q=1 and (m+n+p)q=113
and 5.0% of a monomer of formula (I) in which
  $R_1$ represents hydrogen
  $R_2$ represents hydrogen
  R represents the methacrylurethane group
  R' represents the methyl radical
  where m=p=0; n=113; q=1 and (m+n+p)q=113
c) 0.1% ethyl acrylate
of intrinsic viscosity equal to 32.1 ml/g according to the above-mentioned intrinsic viscosity method, to obtain, from a calcium carbonate with a median diameter of 15 µm, an aqueous suspension of ground calcium carbonate having a dry matter concentration equal to about 76% by weight and having a grain size such that 91% by weight of the particles have a diameter of less than 2 µm measured on the Sédigraph™ 5100.

To do this, use is made of the same equipment and the same grinding procedure to obtain the calcium carbonate aqueous suspension.

The dry matter concentration and Brookfield™ viscosity ($T_0$) results obtained using the same method as test No. 4 are as follows:
Dry matter concentration=74.7%
Viscosity ($T_0$)=295 mPa.s The calcium carbonate slurry thus obtained is then diluted to 50% and then mixed with a 50% by weight aqueous dispersion of an acrylic ester copolymer marketed by BASF under the name Acronal™ S 360 D, under the same conditions and using the same ratio as test No. 3 in order to form a coating colour which is coated on the same support paper as that used in test No. 3.

The 75° TAPPI gloss value is then measured, using a BYK-Gardner laboratory gloss meter, without any calendering performed under the same conditions and using the same equipment as in test No. 3.

The results obtained are:
Gloss 75° TAPPI=46.3

Test No. 10

This test illustrates the invention and implements 1.60% by dry weight, with respect to the calcium carbonate dry weight, of a copolymer consisting, by weight, of:
a) 11.8% acrylic acid and 16.1% methacrylic acid
b) 69.1% of a monomer of formula (I) in which
  $R_1$ represents hydrogen
  $R_2$ represents hydrogen
  R represents the methacrylate group
  R' represents the methyl radical
  where m=p=0; n=113; q=1 and (m+n+p)q=113
and 3.0% of a monomer of formula (I) in which
  $R_1$ represents the methyl radical
  $R_2$ represents hydrogen
  R represents the methacrylamide group
  R' represents the methyl radical
  where m=3; n=9; p=0; q=1 and (m+n+p)q=27 of intrinsic viscosity equal to 61.1 ml/g according to the above-mentioned intrinsic viscosity method, to obtain, from a calcium carbonate with a median diameter of 15 µm, an aqueous suspension of ground calcium carbonate having a dry matter concentration equal to 76% by weight and having a grain size such that 92% by weight of the particles have a diameter of less than 2 µm measured on the Sédigraph™ 5100.

To do this, use is made of the same equipment and the same grinding procedure to obtain the calcium carbonate aqueous suspension.

The dry matter concentration and Brookfield™ viscosity ($T_0$) results obtained using the same method as test No. 4 are as follows:
Dry matter concentration=76.0%
Viscosity ($T_0$)=610 mPa.s The calcium carbonate slurry thus obtained is then diluted to 50% and then mixed, with a 50% by weight aqueous dispersion of an acrylic ester copolymer marketed by BASF under the name Acronal™ S 360 D, under the same conditions and using the same ratio as test No. 3 in order to form a coating colour which is coated on the same support paper as that used in test No. 3.

The 75° TAPPI gloss value is then measured, using a BYK-Gardner laboratory gloss meter, without any calendering performed under the same conditions and using the same equipment as in test No. 3.

The results obtained are:
Gloss 75° TAPPI=50.0

It can be observed from the gloss results of tests No. 3 to 7 that the paper coated with coating colours containing aqueous suspensions of calcium carbonate according to the invention have a higher gloss irrespective of the viewing angle, i.e. an angle of between 20° and 85°, and more particularly between 45° and 75°, than paper coated with the standard coating colours of the prior art.

It can be observed from the gloss results of tests No. 8 to 10 that the paper coated with coating colours containing aqueous suspensions of calcium carbonate according to the invention have a higher gloss even the paper is not calendered.

EXAMPLE 3

This example relates to the use of copolymers according to the invention in a method for grinding mineral fillers, and more particularly calcium carbonate. It also relates to the use of the suspensions thus obtained in the manufacture of paper coating colour, said coating colours being used to coat papers. This example also relates to the measurement of the gloss of the papers thus obtained.

In the tests corresponding to this example, the first step is to disperse a suspension of mineral matter, in accordance with one of the methods familiar to the skilled man in the art.

The viscosity of said suspensions is determined by implementing the same procedure and using the same equipment as those used in example 2.

Said suspensions then enter into the composition of the coating colours.

In this example, each of the coating colours is made following the same procedure and using the same equipment as those used in example 2.

Finally, the gloss of the coated and calendered paper sheet is measured, following the same procedure and using the same equipment as those used in example 2.

Test No. 11

This test illustrates the prior art and implements 0.49% by dry weight, with respect to the dry weight of calcium carbonate, of a neutralized magnesium and sodium polyacrylate having an intrinsic viscosity equal to 7.8 ml/g according to the above-mentioned intrinsic viscosity method, for dispersal in water, and having a dry matter concentration equal to 72.2%, a calcium carbonate having a grain size such that 96% by weight of the particles have a diameter of less than 2 μm and 74% by weight of the particles have a diameter of less than 1 μm measured on the Sédigraph™ 5100.

The results obtained are:
Gloss at 20°=2.70
Gloss at 60°=32
Gloss at 85°=86

Test No. 12

This test illustrates the invention and implements, in accordance with the same procedure as the previous test, 0.77% by dry weight, with respect to the calcium carbonate dry weight, of the copolymer of test No. 2 according to the invention.

The results obtained are:
Gloss at 20°=3.25
Gloss at 60°=42
Gloss at 85°=87

Test No. 13

This test illustrates the invention and implements, in accordance with the same procedure as the previous test, 0.87% by dry weight, with respect to the calcium carbonate dry weight, of the copolymer of test No. 6 according to the invention.

The results obtained are:
Gloss at 20°=2.75
Gloss at 60°=36
Gloss at 85°=86.5

It can be observed from the gloss results of tests No. 11 to 13 that paper coated with coating colours containing aqueous suspensions of calcium carbonate according to the invention has a higher gloss that paper coated with standard coating colours of the prior art.

EXAMPLE 4

This example illustrates the coating colour manufacturing method and relates to the use of copolymers according to the invention as additives in the suspension of mineral matter used in the manufacture of the paper coating colours.

This example also relates to the measurement of the gloss of the papers thus obtained. This example finally illustrates the effectiveness of the copolymers according to the invention as gloss activator of coated papers.

Test No. 14

This test is a control test which illustrates a coating colour implementing any additive in the suspension of mineral matter.

The coating colour is thus realised by mixing first a suspension of calcium carbonate marketed by OMYA under the name Covercarb™ 75ME with a suspension of kaolin marketed by HUBER under the name Hydragloss™ 90 corresponding to 100 parts by weight of dry pigment consisting of 70 parts of calcium carbonate and 30 parts of kaolin and then by adding successively for these 100 parts:
  the quantity of water necessary to obtain a suspension of dry matter concentration equal to 60%
  1 part by dry weight of polyvinyl alcohol marketed by CLARIANT under the name Mowiol™ 4-98
  1 part by dry weight of carboxymethyl cellulose marketed by NOVIANT under the name Finnfix® 10
  12 parts by dry weight of styrene-butadiene latex marketed by DOW CHEMICAL under the name DL966™
  and 0.8 parts by weight of optical brightener Blancophor P™ marketed by BAYER Once these additives are made, stirring is maintained for another 15 minutes.

The pH of the coating colour is then checked and brought to a value of 8.6 by means of a 10% soda solution.

The dry matter content of the coating colour is also checked and brought to a value of 59.8% by adding water if necessary.

The Brookfield™ viscosity of the coating colour obtained as measured at 32° C. using the Brookfield™ RVT model viscometer fitted with the corresponding spindle is equal to 7020 mPa.s at 10 min$^{-1}$ and 1240 mPa.s at 100 min$^{-1}$.

The coating colour obtained is used to coat a 21×29.7 cm sheet of paper with a specific weight of 96 g/m$^2$ by means of a coater from K-Coater laboratory.

This sheet of paper is thus coated to 10 g/m$^2$ and then dried in a non-ventilated steamroom for 5 minutes at 50° C.

The paper thus coated is then calendered twice using a Ramisch type RK22HU at a temperature of 80° C. and under pressure of 40 bar.

The calendered paper samples are then cut into DIN A3 format and are conditioned in an air conditioned room as per standard DIN EN 20187 to determine the 75° TAPPI gloss value according to Lehmann using the gloss meter from BYK-Gardner.

The result obtained is:
Gloss at 75° TAPPI=70.6.

Test No. 15

This test illustrates the invention and implements a coating colour containing a copolymer according to the invention added in the suspension of mineral matter.

The coating colour is thus realised by mixing first a suspension of calcium carbonate marketed by OMYA under the name Covercarb™ 75ME with a suspension of kaolin marketed by HUBER under the name Hydragloss™ 90 corresponding to 100 parts by weight of dry pigment consisting of 70 parts of calcium carbonate and 30 parts of kaolin and then by adding successively for these 100 parts:

- 0.35 parts by dry weight of a soda neutralized copolymer according to the invention, consisting by weight of:
- a) 5.9% acrylic acid and 1.6% methacrylic acid
- b) 92.5% of a monomer of formula (I) in which
  - $R_1$ represents hydrogen
  - $R_2$ represents hydrogen
  - R represents the methacrylate group
  - R' represents the methyl radical
  - where $m=p=0$; $n=113$; $q=1$ and $(m+n+p)q=113$
- of intrinsic viscosity equal to 21.0 ml/g according to the above-mentioned intrinsic viscosity method,
- the quantity of water necessary to obtain a suspension of dry matter concentration equal to 60%
- 1 part by dry weight of polyvinyl alcohol marketed by CLARIANT under the name Mowiol™ 4-98
- 1 part by dry weight of carboxymethyl cellulose marketed by NOVIANT under the name Finnfix® 10
- 12 parts by dry weight of styrene-butadiene latex marketed by DOW CHEMICAL under the name DL966™
- and 0.8 parts by weight of optical brightener Blancophor P™ marketed by BAYER Once these additives are made, stirring is maintained for another 15 minutes.

The pH of the coating colour is then checked and brought to a value of 8.6 by means of a 10% soda solution.

The dry matter content of the coating colour is also checked and brought to a value of 59.8% by adding water if necessary.

The Brookfield™ viscosity of the coating colour obtained as measured at 32° C. using the Brookfield™ RVT model viscometer fitted with the corresponding spindle is equal to 9340 mPa.s at 10 min$^{-1}$ and 1640 mPa.s at 100 min$^{-1}$.

The coating colour obtained is used to coat a 21×29.7 cm sheet of paper with a specific weight of 96 g/m² by means of a coater from K-Coater laboratory by implementing the same procedure and using the same equipment as in test No. 14.

The paper thus coated is then calendered following the same procedure and using the same equipment as those used in test No. 14.

The 75° TAPPI gloss value according to Lehmann using the gloss meter from BYK-Gardner is equal to 72.7.

Test No. 16

This test illustrates the invention and implements a coating colour containing a copolymer according to the invention added in the suspension of mineral matter.

The coating colour is thus realised by mixing first a suspension of calcium carbonate marketed by OMYA under the name Covercarb™ 75ME with a suspension of kaolin marketed by HUBER under the name Hydragloss™ 90 corresponding to 100 parts by weight of dry pigment consisting of 70 parts of calcium carbonate and 30 parts of kaolin and then by adding successively for these 100 parts:

- 0.70 part by dry weight of same copolymer according to the invention as the copolymer implemented in the previous test,
- the quantity of water necessary to obtain a suspension of dry matter concentration equal to 60%
- 1 part by dry weight of polyvinyl alcohol marketed by CLARIANT under the name Mowiol™ 4-98
- 1 part by dry weight of carboxymethyl cellulose marketed by NOVIANT under the name Finnfix® 10
- 12 parts by dry weight of styrene-butadiene latex marketed by DOW CHEMICAL under the name DL966™
- and 0.8 parts by weight of optical brightener Blancophor P™ marketed by BAYER Once these additives are made, stirring is maintained for another 15 minutes.

The pH of the coating colour is then checked and brought to a value of 8.6 by means of a 10% soda solution.

The dry matter content of the coating colour is also checked and brought to a value of 59.8% by adding water if necessary.

The Brookfield™ viscosity of the coating colour obtained as measured at 32° C. using the Brookfield™ RVT model viscometer fitted with the corresponding spindle is equal to 10000 mPa.s at 10 min$^{-1}$ and 1760 mPa.s at 100 min$^{-1}$.

The coating colour obtained is used to coat a 21×29.7 cm sheet of paper with a specific weight of 96 g/m² by means of a coater from K-Coater laboratory by implementing the same procedure and using the same equipment as in test No. 14.

The paper thus coated is then calendered following the same procedure and using the same equipment as those used in test No. 14.

The 75° TAPPI gloss value according to Lehmann using the gloss meter from BYK-Gardner is equal to 73.5.

It can be observed from the gloss results of tests No. 14 to 16 that the paper coated with coating colours containing aqueous suspensions of calcium carbonate additived according to the invention have a higher gloss than paper coated with the standard coating colours.

EXAMPLE 5

This example illustrates the coating colour manufacturing method and relates to the use of copolymers according to the invention as additives in the manufacture of the paper coating colours.

This example also relates to the measurement of the gloss of the papers thus obtained. This example finally illustrates the effectiveness of the copolymers according to the invention as gloss activator of coated papers.

To do this, the test No. 14 is also a control test, the following test No. 17 illustrating the invention.

Test No. 17

The coating colour is thus realised by mixing first a suspension of calcium carbonate marketed by OMYA under the name Covercarb™ 75ME with a suspension of kaolin marketed by HUBER under the name Hydragloss™ 90 corresponding to 100 parts by weight of dry pigment consisting of 70 parts of calcium carbonate and 30 parts of kaolin and then by adding successively for these 100 parts:

- the quantity of water necessary to obtain a suspension of dry matter concentration equal to 60%
- 1 part by dry weight of polyvinyl alcohol marketed by CLARIANT under the name Mowiol™ 4-98
- 1 part by dry weight of carboxymethyl cellulose marketed by NOVIANT under the name Finnfix® 10
- 12 parts by dry weight of styrene-butadiene latex marketed by DOW CHEMICAL under the name DL966™
- 1.0 part by dry weight of same copolymer according to the invention as the copolymer implemented in the previous test,
- and 0.8 parts by weight of optical brightener Blancophor P™ marketed by BAYER Once these additives are made, stirring is maintained for another 15 minutes.

The pH of the coating colour is then checked and brought to a value of 8.6 by means of a 10% soda solution.

The dry matter content of the coating colour is also checked and brought to a value of 59.8% by adding water if necessary.

The Brookfield™ viscosity of the coating colour obtained as measured at 32° C. using the Brookfield™ RVT model viscometer fitted with the corresponding spindle is equal to 1250 mPa.s at 10 min$^{-1}$ and 340 mPa.s at 100 min$^{-1}$.

The coating colour obtained is used to coat a 21×29.7 cm sheet of paper with a specific weight of 96 g/m$^2$ by means of a coater from K-Coater laboratory by implementing the same procedure and using the same equipment as in test No. 14.

The paper thus coated is then calendered following the same procedure and using the same equipment as those used in test No. 14.

The 75° TAPPI gloss value according to Lehmann using the gloss meter from BYK-Gardner is equal to 73.0.

It can be observed from the gloss results of tests No. 14 and 17 that the paper coated with coating colours containing the copolymer according to the invention used as additive of the coating colour have a higher gloss than paper coated with the standard coating colours.

EXAMPLE 6

This example illustrates a paint composition containing the copolymer according to the invention and relates to the use of copolymers according to the invention as gloss activator of the paint. This example also relates to the measurement of the gloss of the paint obtained.

To do this, the glycerol paints are prepared by mixing successively the following compounds by dry weight:
  240.0 g Synolac™ 6868 WL 75 (long-oil alkyde from Cray Valley)
  20.0 g white spirit BT
  240.0 g RL 60 (titane dioxide from Millenium)
  240.0 g suspension of calcium carbonate for testing
  190.0 g Synolac™ 6868 WL 75 (long-oil alkyde from Cray Valley)
  3.5 g white spirit BT
  3.5 g dryer product (Octa Soligen Calcium 10 from Borchers)
  20.0 g white spirit BT
  2 g antiskinning (Borchinox M2 from Borchers)
  21.0 g white spirit BT Once these paint formulations are made, the gloss value at 20° is determined as follows:

Two applications are made on Leneta contrast card to 150 μm wet for each paint.

The applications are repeated 24 hours and one month after manufacturing. The measurements are then taken at 7 days and one month old.

The system used is a Minolta MultiGloss 268 glossmeter from an angle of 20°. Each value is the calculated average on the two cards with 5 points per card.

Test No. 18

This test illustrates the prior art and implements a suspension of calcium carbonate. ground by the use of a sodium polyacrylate of the prior art.
  The results obtained are:
  Gloss at 20° 7 days (application at 24 hours)=59
  Gloss at 20° 1 month (application at 24 hours)=45
  Gloss at 20° 7 days (application at 1 month)=67
  Gloss at 20° 1 month (application at 1 month)=53.

Test No. 19

This test illustrates the invention and implements a grinding suspension of calcium carbonate by using a copolymer according to the invention.

The said copolymer is neutralised by triethanolamine and is composed of:
  a) 45.1% acrylic acid and 0.55% methacrylic acid
  b) 11.75% of a monomer of formula (I) in which
    $R_1$ represents hydrogen
    $R_2$ represents hydrogen
    R represents the methacrylate group
    R' represents an alkyl radical at 15 carbon atoms
    with m=0; p=0; q=1 and n=50,
  c) 42.6% of acrylamide
  The results obtained are:
  Gloss at 20° 7 days (application at 24 hours)=65
  Gloss at 20° 1 month (application at 24 hours)=55
  Gloss at 20° 7 days (application at 1 month)=71
  Gloss at 20° 1 month (application at 1 month)=58.

It can be observed from the results of tests No. 18 and 19 that the copolymer according to the invention is efficient as a gloss activator.

The invention claimed is:

1. A gloss activator comprising a water-soluble and weakly ionic copolymer having least one alkoxy or hydroxy polyalkylene glycol function grafted onto at least one ethylenically unsaturated monomer.

2. The gloss activator of claim 1, wherein said copolymer comprises at least one monomer of formula (I):

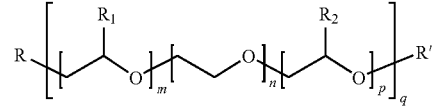

where
  m and p represent a number of alkylene oxide units less than or equal to 150,
  n represents a number of ethylene oxide units less than or equal to 150,
  q represents an integer equal to at least 1 and such that $5 \leq (m+n+p)q \leq 150$,
  $R_1$ represents hydrogen or the methyl or ethyl radical,
  $R_2$ represents hydrogen or the methyl or ethyl radical,
  R represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α'dimethyl-isopropenyl-benzylurethane and allylurethane, and to the group of allyl or vinyl ethers, whether or not substituted, or to the group of ethylenically unsaturated amides or imides,
  R' represents hydrogen or a hydrocarbon radical having from 1 to 40 carbon atoms,
and wherein said copolymer has an intrinsic viscosity less than or equal to 100 ml/g determined in accordance with the method known as the intrinsic viscosity method.

3. The gloss activator according to claim 2, wherein q in formula (I) represents an integer such that $15 \leq (m+n+p)q \leq 120$.

4. The gloss activator according to claim 2, wherein R' in formula (I) represents a hydrocarbon radical having from 1 to 12 carbon atoms.

5. The gloss activator according to claim 2, wherein R' in formula (I) represents a hydrocarbon radical having from 1 to 4 carbon atoms.

6. The gloss activator according to claim 1, characterized in that said copolymer comprises:

a) at least one anionic monomer with a carboxyl or dicarboxyl or sulfonic or phosphoric or phosphonic function or a mixture thereof, b) at least one non-ionic monomer, the non-ionic monomer comprising at least one monomer of formula (I):

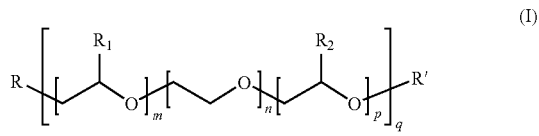

where
m and p represent a number of alkylene oxide units less than or equal to 150,
n represents a number of ethylene oxide units less than or equal to 150,
q represents an integer equal to at least 1 and such that $5 \leq (m+n+p)q \leq 150$, $R_1$ represents hydrogen or the methyl or ethyl radical,
$R_2$ represents hydrogen or the methyl or ethyl radical,
R represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α'dimethyl-isopropenyl-benzylurethane and allylurethane, and to the group of allyl or vinyl ethers, whether or not substituted, or to the group of ethylenically unsaturated amides or imides, and
R' represents hydrogen or a hydrocarbon radical having from 1 to 40 carbon atoms, or a mixture of several monomers of formula (I), c) at least one monomer of the acrylamide or methacrylamide type or their derivatives such as N-[3-(dimethylamino)propyl]acrylamide or N-[3-(dimethylamino)propyl]methacrylamide, and their mixtures, or at least one non water-soluble monomer such as the alkyl acrylates or methacrylates, unsaturated esters such as N-[2-(dimethylamino)ethyl]methacrylate, or N-[2-(dimethylamino)ethyl]acrylate, vinyls such as vinyl acetate, vinylpyrrolidone, styrene, alphamethylstyrene and their derivatives, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl animonium chloride or sulphate, dimethyl diallyl ammonium chloride or sulphate, [3-(methacrylamido)propyl]trimethyl ammonium chloride or sulphate, or at least one organofluorinated or organosilylated monomer, or a mixture of several of these monomers, d) at least one monomer having at least two ethylenic insaturations referred to as a crosslinking monomer, the total of the proportions of components a), b), c) and d) being equal to 100%, and wherein said copolymer has an intrinsic viscosity less than or equal to 100 ml/g determined in accordance with the method known as the intrinsic viscosity method.

7. The gloss activator according to claim 6, wherein q in formula (I) represents an integer such that $15 \leq (m+n+p)q \leq 120$.

8. The gloss activator according to claim 6, wherein R' in formula (I) represents a hydrocarbon radical having from 1 to 12 carbon atoms.

9. The gloss activator according to claim 6, wherein R' in formula (I) represents a hydrocarbon radical having from 1 to 4 carbon atoms.

10. The gloss activator according to claim 1, wherein the organosilylated monomer is selected from among the molecules of formulae (IIa) or (IIb), with formula (IIa):

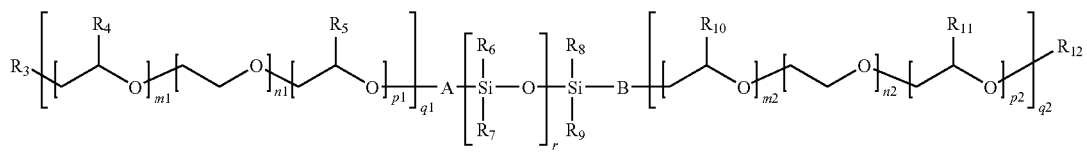

where
m1, p1, m2 and p2 represent a number of alkylene oxide units less than or equal to 150
n1 and n2 represent a number of ethylene oxide units less than or equal to 150
q1 and q2 represent an integer equal to at least 1 and such that $0 \leq (m1+n1+p1)q1 \leq 150$ and $0 \leq (m2+n2+p2)q2 \leq 150$,
r represents a number such that $1 \leq r \leq 200$,
$R_3$ represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α'dimethyl-isopropenyl-benzylurethane and allylurethane, and to the group of allyl or vinyl ethers, whether or not substituted, or to the group of ethylenically unsaturated amides or imides,
$R_4$, $R_5$, $R_{10}$ and $R_{11}$ represent hydrogen or the methyl or ethyl radical
$R_6$, $R_7$, $R_8$ and $R_9$ represent straight or branched alkyl, aryl, alkylaryl or arylalkyl groups having from 1 to 20 carbon atoms, or a mixture thereof
$R_{12}$ represents a hydrocarbon radical having from 1 to 40 carbon atoms,
A and B are groups which may be present, in which case they represent a hydrocarbon radical having from 1 to 4 carbon atoms,
with formula (IIb)

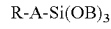

R-A-Si(OB)$_3$ where
R represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α'dimethyl-isopropenyl-benzylurethane and allylurethane, and to the group of allyl or vinyl ethers, whether or not substituted, or to the group of ethylenically unsaturated amides or imides, A is a group which may be present, in which case it represents a hydrocarbon radical having from 1 to 4 carbon atoms, B represents a hydrocarbon radical having from 1 to 4 carbon atoms, or a mixture of several of said monomers, and in that the crosslinking monomer is selected from the group consisting of ethylene glycol dimethacrylate, trimethylolpropanetriacrylate, allyl acrylate, the allyl maleates, methylene-bis- acrylamide, methylene-bis-methacrylamide, tetrallyloxyethane, triallylcyanurates, allyl ethers prepared from polyols such as pentaerythritol, sorbitol, sucrose, or selected from among the molecules of formula (III):

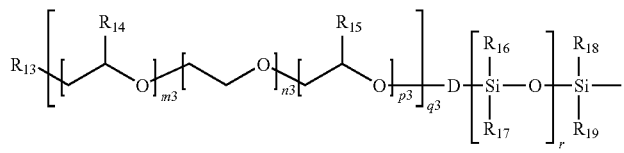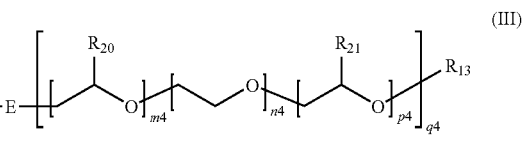

where
m3, p3, m4 and p4 represent a number of alkylene oxide units less than or equal to 150
n3 and n4 represent a number of ethylene oxide units less than or equal to 150
q3 and q4 represent an integer equal to at least 1 and such that $0 \leq (m3+n3+p3)q3 \leq 150$ and $0 \leq (m4+n4+p4)q4 \leq 150$,
r' represents a number such that $1 \leq r' \leq 200$,
$R_{13}$ represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α'dimethyl-isopropenyl-benzylurethane and allylurethane, and to the group of allyl or vinyl ethers, whether or not substituted, or to the group of ethylenically unsaturated amides or imides,
$R_{14}$, $R_{15}$, $R_{20}$ and $R_{21}$ represent hydrogen or the methyl or ethyl radical
$R_{16}$, $R_{17}$, $R_{18}$ and $R_{19}$ represent straight or branched alkyl, aryl, alkylaryl or arylalkyl groups having from 1 to 20 carbon atoms, or a mixture thereof
D and E are groups which may be present, in which case they represent a hydrocarbon radical having from 1 to 4 carbon atoms,
or a mixture of several of said monomers.

11. The gloss activator of claim 1, wherein the copolymer comprises, by weight:
a) from 2% to 95% of at least one ethylenically unsaturated anionic monomer having a monocarboxyl function selected from among the ethylenically unsaturated monomers having a monocarboxyl function such as acrylic or methacrylic acid or hemiesters of diacids such as $C_1$ to $C_4$ monoesters of maleic or itaconic acid, or mixtures thereof, or having a dicarboxyl function selected from among the ethylenically unsaturated monomers having a dicarboxyl function such as crotonic, isocrotonic, cinnamic, itaconic, maleic acid, or anhydrides of carboxyl acids, such as maleic anhydride or having a sulfonic function selected from among the ethylenically unsaturated monomers having a sulfonic function such as acrylamido-methyl-propane-sulfonic acid, sodium methallylsulfonate, vinylsulfonic acid and styrenesulfonic acid or having a phosphoric function selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or having a phosphonic function selected from among the ethylenically unsaturated monomers having a phosphonic function such as vinylphosphonic acid, or mixtures thereof, a) from 2 to 95% of at least one non-ionic ethylenically unsaturated monomer of formula (I):

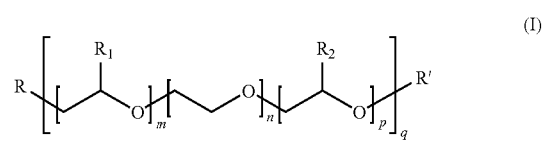

where
m and p represent a number of alkylene oxide units less than or equal to 150,
n represents a number of ethylene oxide units less than or equal to 150,
q represents an integer equal to at least 1 and such that $5 \leq (m+n+p)q \leq 150$,
$R_1$ represents hydrogen or the methyl or ethyl radical,
$R_2$ represents hydrogen or the methyl or ethyl radical,
R represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α'dimethyl-isopropenyl-benzylurethane and allylurethane, and to the group of allyl or vinyl ethers, whether or not substituted, or to the group of ethylenically unsaturated amides or imides, and
R' represents hydrogen or a hydrocarbon radical having from 1 to 40 carbon atoms,
or a mixture of several monomers of formula (I),
c) from 0% to 50% of at least one monomer of the acrylamide or methacrylamide type or their derivatives such as N-[3-(dimethylamino)propyl]acrylamide or N-[3-(dimethylamino)propyl]methacrylamide, and their mixtures, or at least one non water-soluble monomer such as the alkyl acrylates or methacrylates, unsaturated esters such as N-[2-(dimethylamino)ethyl]methacrylate, or N-[2-

(dimethylamino)ethyl]acrylate, vinyls such as vinyl acetate, vinylpyrrolidone, styrene, alphamethylstyrene and their derivatives, or at least one cationic monomer or quaternary ammonium such as [2-(methacryloyloxy) ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or at least one organofluorinated or at least one organosilylated monomer, selected preferably from among molecules of formulae (IIa) or (IIb), with formula (IIa):

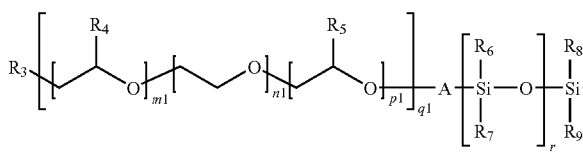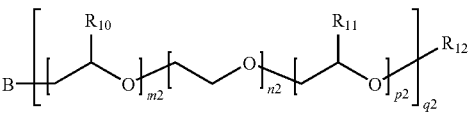

where
  m1, p1, m2 and p2 represent a number of alkylene oxide units less than or equal to 150
  n1 and n2 represent a number of ethylene oxide units less than or equal to 150
  q1 and q2 represent an integer equal to at least 1 and such that $0 \leq (m1+n1+p1)q1 \leq 150$ and $0 \leq (m2+n2+p2)q2 \leq 150$,
  r represents a number such that $1 \leq r \leq 200$,
  $R_3$ represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α'dimethyl-isopropenyl-benzylurethane and allylurethane, and to the group of allyl or vinyl ethers, whether or not substituted, or to the group of ethylenically unsaturated amides or imides,
  $R_4$, $R_5$, $R_{10}$ and $R_{11}$ represent hydrogen or the methyl or ethyl radical
  $R_6$, $R_7$, $R_8$ and $R_9$ represent straight or branched alkyl, aryl, alkylaryl or arylalkyl groups having from 1 to 20 carbon atoms, or a mixture thereof
  $R_{12}$ represents a hydrocarbon radical having from 1 to 40 carbon atoms,
  A and B are groups which may be present, in which case they represent a hydrocarbon radical having from 1 to 4 carbon atoms,
with formula (IIb)
  $R-A-Si(OB)_3$ where
  R represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α'dimethyl-isopropenyl-benzylurethane and allylurethane, and to the group of allyl or vinyl ethers, whether or not substituted, or to the group of ethylenically unsaturated amides or imides,
  A is a group which may be present, in which case it represents a hydrocarbon radical having from 1 to 4 carbon atoms,
  B represents a hydrocarbon radical having from 1 to 4 carbon atoms,
or a mixture of several of said monomers,
d) from 0% to 3% of at least one crosslinking monomer selected from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, allyl ethers prepared from polyols such as pentaerythritol, sorbitol, sucrose, or selected from the molecules of formula (III):

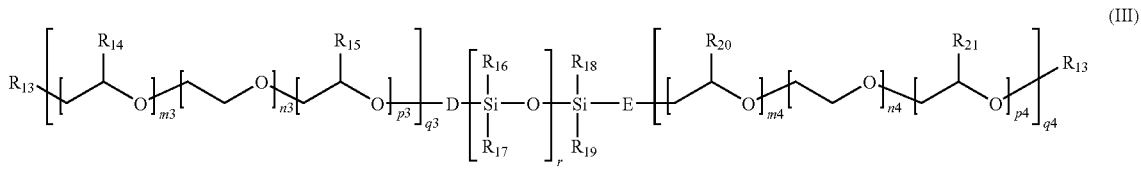

where
  m3, p3, m4 and p4 represent a number of alkylene oxide units less than or equal to 150
  n3 and n4 represent a number of ethylene oxide units less than or equal to 150
  q3 and q4 represent an integer equal to at least 1 and such that $0 \leq (m3+n3+p3)q3 \leq 150$ and $0 \leq (m4+n4+p4)q4 \leq 150$,
  r' represents a number such that $1 \leq r' \leq 200$
  $R_{13}$ represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α'dimethyl-isopropenyl-benzylurethane and allylurethane, and to the group of allyl or vinyl ethers, whether or not substituted, or to the group of ethylenically unsaturated amides or imides, R₁₄, R₁₅, R₂₀ and R₂₁ represent hydrogen or the methyl or ethyl radical R₁₆, R₁₇, R₁₈ and R₁₉ represent straight or branched alkyl, aryl, alkylaryl or arylatkyl groups having from 1 to 20 carbon atoms, or a mixture thereof D and E are groups which may be present, in which case they represent a hydrocarbon radical having from 1 to 4 carbon atoms, or a mixture of several of said monomers,
the total of the proportions of components a), b), c) and d) being equal to 100%, and wherein the copolymer has intrinsic viscosity less than or equal to 100 ml/g determined in accordance with the method known as the intrinsic viscosity method.

12. The gloss activator according to claim 11, wherein said copolymer comprises from 5% to 90% of component a).

13. The gloss activator according to claim 11, wherein said copolymer comprises from 5% to 90% of component b).

14. The gloss activator according to claim 11, wherein q in formula (I) represents an integer such that $15 \leq (m+n+p)q \leq 120$.

15. The gloss activator according to claim 11, wherein R' in formula (I) represent a hydrocarbon radical having from 1 to 12 carbon atoms.

16. The gloss activator according to claim 11, wherein R' in formula (I) represent a hydrocarbon radical having from 1 to 4 carbon atoms.

17. The gloss activator according to claim 1, characterized in that said copolymer is in its acid form or fully or partially neutralized by one or more neutralizing agents having a monovalent neutralizing function or a polyvalent neutralizing function such as, for the monovalent function, those selected from among the group consisting of the alkaline cations, in particular sodium, potassium, lithium, ammonium or the primary, secondary or tertiary aliphatic and/or cyclic amines such as stearylamine, the ethanolamines (mono-, di-, triethanolamine), mono and diethylamine, cyclohexylamine, methylcyclohexylamine, aminomethylpropanol, morpholine or, for the polyvalent function, those selected from among the group consisting of alkaline earth divalent cations, in particular magnesium and calcium, or zinc, and of the trivalent cations, including in particular aluminium, or of certain cations of higher valency.

18. The gloss activator of claim 1, wherein said copolymer has an intrinsic viscosity less than or equal to 100 ml/g determined in accordance with the method known as the intrinsic viscosity method.

19. A method for dispersing an aqueous suspension of mineral matter comprising the step of dispersing the mineral matter in the presence of the gloss activator according to claim 1.

20. The method according to claim 19, wherein said copolymer comprises 0.05% to 5% by dry weight with respect to the dry weight of the fillers and/or pigments.

21. The method according to claim 19, wherein said copolymer comprises 0.1% to 2.5% by dry weight with respect to the dry weight of the fillers and/or pigments.

22. The method according to claim 19, characterized in that the mineral matter is selected from among calcium carbonate, dolomites, kaolin, calcine kaolin, talc, gypsum, titanium oxide, satin white or aluminium trihydroxide, mica and the mixture of these fillers, such as talc-calcium carbonate or calcium carbonate-kaolin mixtures, or mixtures of calcium carbonate with aluminium trihydroxide, or mixtures with synthetic or natural fibres or co-structures of minerals such as talc-calcium carbonate or talc-titanium dioxide co-structures.

23. The method according to claim 19, characterized in that the mineral matter is calcium carbonate selected from marble, calcite, chalk or their mixtures.

24. An aqueous suspension of mineral matter comprising the gloss activator according to claim 1.

25. The aqueous suspension of mineral matter according to claim 24, characterized in that it contains from 0.05% to 5% of said copolymer by dry weight with respect to the dry weight of mineral matter.

26. The aqueous suspension of mineral matter according to claim 24, characterized in that it contains from 0.1% to 2.5% of said copolymer by dry weight with respect to the dry weight of mineral matter.

27. The aqueous suspension of mineral matter according to claim 24, characterized in that the mineral matter is selected from among calcium carbonate, dolomites, kaolin, calcine kaolin, talc, gypsum, titanium oxide, satin white or aluminium trihydroxide, mica and the mixture of these fillers, such as talc-calcium carbonate or calcium carbonate-kaolin mixtures, or mixtures of calcium carbonate with aluminium trihydroxide, or mixtures with synthetic or natural fibres or co-structures of minerals such as talc-calcium carbonate or talc-titanium dioxide co-structures.

28. The aqueous suspension of mineral matter according to claim 24, characterized in that the mineral matter is calcium carbonate selected from marble, calcite, chalk or their mixtures.

29. A method for grinding an aqueous suspension of mineral matter comprising the step of grinding the aqueous suspension of mineral matter in the presence of the gloss activator according to claim 1.

30. The method according to claim 29, characterized in that it contains from 0.05% to 5% by dry weight of said copolymer with respect to the dry weight of the fillers and/or pigments.

31. The method according to claim 29, characterized in that it contains from 0.1% to 2.5% by dry weight of said copolymer with respect to the dry weight of the fillers and/or pigments.

32. The method according to claim 29, characterized in that the mineral matter is selected from among calcium carbonate, dolomites, kaolin, calcine kaolin, talc, gypsum, titanium oxide, satin white or aluminium trihydroxide, mica and the mixture of these fillers, such as talc-calcium carbonate or calcium carbonate-kaolin mixtures, or mixtures of calcium carbonate with aluminium trihydroxide, or mixtures with synthetic or natural fibres or co-structures of minerals such as talc-calcium carbonate or talc-titanium dioxide co-structures.

33. The aqueous suspension of mineral matter according to claim 29, characterized in that the mineral matter is calcium carbonate selected from marble, calcite, chalk or their mixtures.

34. The aqueous suspension according to claim 29, wherein the mineral matter is ground mineral matter.

35. Paper comprising a pigment prepared from the aqueous suspension of mineral matter according to claim 24, wherein the pigment is included in the coating or surface treatment of the paper.

36. Paint comprising a pigment prepared from the aqueous suspension of mineral matter according to claim 24.

37. Plastic comprising a pigment prepared from the aqueous suspension of mineral matter according to claim 24.

38. A coating colour prepared from the gloss activator according to claim 1.

39. The coating colour according to claim 38, characterized in that it contains 0.05% to 5% of said copolymer by dry weight with respect to the dry weight of the mineral matter.

40. The coating colour according to claim 38, characterized in that it contains 0.1% to 2.5% of said copolymer by dry weight with respect to the dry weight of mineral matter.

41. Paper comprising the gloss activator of claim 1.

42. Paint comprising the gloss activator of claim 1.

43. Plastic comprising the gloss activator of claim 1.

* * * * *